United States Patent
Yu et al.

(10) Patent No.: US 12,366,001 B2
(45) Date of Patent: Jul. 22, 2025

(54) MULTI-CHANNEL ALKALINE HYDROGEN PRODUCTION SYSTEM

(71) Applicant: SUNGROW HYDROGEN SCI. & TECH. CO., LTD, Anhui (CN)

(72) Inventors: Deye Yu, Hefei (CN); Jian Wang, Hefei (CN); Yu Gu, Hefei (CN)

(73) Assignee: SUNGROW HYDROGEN SCI. &TECH. CO., LTD, Anhui (CN)

( * ) Notice: Subject to any disclaimer, the term of this patent is extended or adjusted under 35 U.S.C. 154(b) by 481 days.

(21) Appl. No.: 17/796,848

(22) PCT Filed: Mar. 22, 2021

(86) PCT No.: PCT/CN2021/081992
§ 371 (c)(1),
(2) Date: Aug. 1, 2022

(87) PCT Pub. No.: WO2021/213102
PCT Pub. Date: Oct. 28, 2021

(65) Prior Publication Data
US 2023/0060683 A1   Mar. 2, 2023

(30) Foreign Application Priority Data

Apr. 22, 2020 (CN) .......................... 202010321188.5

(51) Int. Cl.
C25B 15/027 (2021.01)
C25B 1/04 (2021.01)
(Continued)

(52) U.S. Cl.
CPC .............. *C25B 15/027* (2021.01); *C25B 1/04* (2013.01); *C25B 15/02* (2013.01); *C25B 15/023* (2021.01); *C25B 15/087* (2021.01)

(58) Field of Classification Search
CPC ....................................................... C25B 1/04
See application file for complete search history.

(56) References Cited

U.S. PATENT DOCUMENTS

| | | | | |
|---|---|---|---|---|
| 10,214,820 B2 * | 2/2019 | Koeneman | ............... | C25B 1/02 |
| 11,414,766 B2 * | 8/2022 | Grader | ...................... | C25B 1/02 |
| 11,643,741 B2 * | 5/2023 | Uchino | .................. | C25B 15/02 |
| | | | | 205/628 |

FOREIGN PATENT DOCUMENTS

| | | |
|---|---|---|
| CN | 2375642 | 4/2000 |
| CN | 202297794 U | 7/2012 |

(Continued)

OTHER PUBLICATIONS

PCT International Search Report and Written Opinion, International Application No. PCT/CN2021/081992, dated Jun. 24, 2021, 12 pages.

*Primary Examiner* — Brian W Cohen
(74) *Attorney, Agent, or Firm* — Kilpatrick Townsend & Stockton LLP

(57) ABSTRACT

A multi-channel alkaline hydrogen production system is disclosed. Using liquid outlets of a hydrogen alkali treatment unit and an oxygen alkali treatment unit, a circulating alkaline liquid is outputted to an alkaline liquid circulating pump and a controllable channel, and then the circulating alkaline liquid is returned to the negative electrode of an electrolyzer; Thus, a controller can control the amount of produced hydrogen according to the measured current of the electrolyzer, then calculates a corresponding alkaline liquid circulation volume reference value according to the amount of produced hydrogen, and according to the alkaline liquid circulation volume reference value, adjusts the circulation amount of the alkaline liquid of the multi-channel alkaline hydrogen production system and changes the gas purity of the multi-channel alkaline hydrogen production system by controlling the working states of the controllable channels on the two ends of the alkaline liquid circulating pump.

19 Claims, 3 Drawing Sheets

(51) Int. Cl.
  *C25B 15/02* (2021.01)
  *C25B 15/023* (2021.01)
  *C25B 15/08* (2006.01)

(56) References Cited

FOREIGN PATENT DOCUMENTS

| CN | 106119885 A | 11/2016 |
| CN | 207347670 U | 5/2018 |
| CN | 111364053 A | 7/2020 |
| CN | 111826670 A | 10/2020 |
| CN | 212404294 U | 1/2021 |
| JP | 63250481 A | 10/1988 |
| WO | WO 2018168109 A1 | 9/2018 |

* cited by examiner

MULTI-CHANNEL ALKALINE HYDROGEN PRODUCTION SYSTEM

The present application is a 35 U.S.C. 371 Patent Application of PCT Application No. PCT/CN2021/081992, titled "MULTI-CHANNEL ALKALINE HYDROGEN PRODUCTION SYSTEM," filed on Mar. 22, 202, which claims priority to Chinese Patent Application No. 202010321188.5, titled "MULTI-CHANNEL ALKALI HYDROGEN PRODUCTION SYSTEM", filed on Apr. 22, 2020 with the Chinese Patent Office, which is incorporated herein by reference in its entirety

FIELD

The present disclosure relates to the technical field of electrolytic hydrogen production, and in particular to a multi-channel alkali hydrogen production system.

BACKGROUND

Among the conventional water electrolytic hydrogen production systems on the market, alkaline electrolyzers have developed for a long time and the technology of the alkaline electrolyzers is mature. The alkaline electrolyzer conventionally includes a transformer, a rectifier and a hydrogen generator. The water electrolytic hydrogen production system is as shown in FIG. 1. An electrolyzer has a positive electrode and a negative electrode. The negative electrode is provided with an outlet of hydrogen and alkali liquor, and the positive electrode is provided with an outlet of oxygen and alkali liquor. The outlet of hydrogen and alkali liquor is connected to a hydrogen-alkali treatment unit at a later stage. The outlet of oxygen and alkali liquor is connected to an oxygen-alkali treatment unit at a later stage. The oxygen-alkali treatment unit at the later stage generates oxygen after treatment, and the hydrogen-alkali treatment unit at the later stage generates hydrogen after treatment. The alkali liquor outputted from the two treatment units passes through an alkali liquor cooler, an alkali liquor circulating pump and an alkali liquor flowmeter sequentially and returns to the negative electrode of the electrolyzer. The system has advantages of simple operation and low cost. However, the system has a disadvantage of low efficiency. A load of the system during operation generally ranges from 30% to 110%, that is, the purity of hydrogen decreases with reduction of the load of the electrolyzer.

Electric energy generated by renewable energy such as wind energy and solar energy is changing all the time due to dynamic nature of the renewable energy, and production amount of hydrogen generated by the renewable energy is also changing dynamically. Taking photovoltaic power generation as an example, the sunlight at noon is strong and the electric energy is relatively sufficient, while the sunlight in the morning and evening is weak and the electric energy is reduced. In addition, the hydrogen production amount of the electrolyzer is directly proportional to a current flowing through the electrolyzer, so that the hydrogen production amount of a renewable energy hydrogen production system is also changing all the time. The renewable energy hydrogen production system is provided with an alkaline electrolyzer. When the alkaline electrolyzer operates at a low load below 20%, the hydrogen purity decreases, which cannot meet use requirements. In this case, the hydrogen must be vented. When the hydrogen purity is less than a low limit interlocking value, the hydrogen production system is interlocked and shut down, that is, hydrogen production is stopped. Therefore, the conventional technology cannot be applicable to hydrogen production from renewable energy.

SUMMARY

In view of the above, a multi-channel alkali hydrogen production system is provided according to the present disclosure, to adjust a flow of alkali liquor in an electrolyzer according to a current value of the electrolyzer, to cause the hydrogen purity to meet requirements of hydrogen production. The electrolyzer operates at a full load, which is applicable to a hydrogen production system powered by a renewable energy system.

A multi-channel alkali hydrogen production system is provided according to the present disclosure. At least one controllable channel is arranged in parallel between an inlet and an outlet of an alkali liquor circulating pump within the multi-channel alkali hydrogen production system.

A controller within the multi-channel alkali hydrogen production system is configured to control a hydrogen production amount according to a detected current of an electrolyzer, calculate an alkali liquor circulation volume reference value according to the hydrogen production amount, and according to the alkali liquor circulation volume reference value, adjust an alkali liquor circulation volume of the multi-channel alkali hydrogen production system and change gas purity of the multi-channel alkali hydrogen production system by controlling an operation state of the controllable channel connected in parallel with the alkali liquor circulating pump.

In an embodiment, the multi-channel alkali hydrogen production system further includes: an electrolyzer, a hydrogen-alkali channel, an oxygen-alkali channel, a hydrogen-alkali treatment unit, an oxygen-alkali treatment unit, and an alkali liquor flowmeter.

An inlet of the hydrogen-alkali treatment unit is connected to a hydrogen-alkali outlet on a negative electrode of the electrolyzer via the hydrogen-alkali channel.

An inlet of the oxygen-alkali treatment unit is connected to an oxygen-alkali outlet on a positive electrode of the electrolyzer via the oxygen-alkali channel.

A liquid outlet of the hydrogen-alkali treatment unit and a liquid outlet of the oxygen-alkali treatment unit are connected to an inlet of the alkali liquor circulating pump and an inlet of the controllable channel connected in parallel with the alkali liquor circulating pump.

An outlet of the alkali liquor circulating pump is connected to an alkali liquor inlet on the negative electrode of the electrolyzer via the alkali liquor flowmeter.

In an embodiment, the controller, for controlling the hydrogen production amount according to the detected current of the electrolyzer, calculating the alkali liquor circulation volume reference value according to the hydrogen production amount, and according to the alkali liquor circulation volume reference value, adjusting the alkali liquor circulation volume of the multi-channel alkali hydrogen production system and changing gas purity of the multi-channel alkali hydrogen production system by controlling the operation state of the controllable channel connected in parallel with the alkali liquor circulating pump, is configured to: control, in a case that the alkali liquor circulation volume reference value is greater than a preset alkali liquor circulation volume, all of the at least one controllable channel connected in parallel with the alkali liquor circulating pump to operate in a full load output state; and control, in a case that the alkali liquor circulation volume reference value is less than or equal to the preset alkali liquor circulation volume, at least one of the at least one controllable channel connected in parallel with the alkali liquor circulating pump to operate in a zero output state and/or an adjustable output state.

In an embodiment, the hydrogen-alkali channel and the oxygen-alkali channel each is provided with at least two controllable channels, the controller is further configured to control operation states of the controllable channels of the hydrogen-alkali channel and the oxygen-alkali channel according to the alkali liquor circulation volume reference value, to adjust the alkali liquor circulation amount to the alkali liquor circulation volume reference value.

In an embodiment, the controller, for controlling operation states of controllable channels of the hydrogen-alkali channel and the oxygen-alkali channel according to the alkali liquor circulation volume reference value, is configured to: control, in a case that the alkali liquor circulation volume reference value is greater than a preset threshold, all of the controllable channels of the hydrogen-alkali channel and the oxygen-alkali channel to operate in a full load output state; and control, in a case that the alkali liquor circulation volume reference value is less than or equal to the preset threshold, at least one of the controllable channels of the hydrogen-alkali channel and at least one of the controllable channels of the oxygen-alkali channel to operate in a zero output state and/or an adjustable output state.

In an embodiment, a gas output channel of the hydrogen-alkali treatment unit and a gas output channel of the oxygen-alkali treatment unit each comprises at least two controllable channels, the multi-channel alkali hydrogen production system further comprises two pressure transmitters, one of the pressure transmitters is configured to detect a pressure detection value of the gas output channel of the hydrogen-alkali treatment unit and the other of the pressure transmitters is configured to detect a pressure detection value of the gas output channel of the oxygen-alkali treatment unit, and the controller is further configured to control operation states of the controllable channels of the two gas output channels according to the pressure detection values detected by the two pressure transmitters, to adjust a gas pressure of the multi-channel alkali hydrogen production system.

In an embodiment, the controller, for controlling operation states of the controllable channels of the two gas output channels according to the pressure detection values detected by the two pressure transmitters, is configured to: control, in a case that the two pressure detection values are both greater than a preset pressure value, the controllable channels of the two gas output channels to operate in a full load output state; and control, in a case that the two pressure detection values are both less than or equal to the preset pressure value, at least one of the controllable channels of the gas output channel of the hydrogen-alkali treatment unit and at least one of the controllable channels of the gas output channel of the oxygen-alkali treatment unit to operate in a zero output state and/or an adjustable output state.

In an embodiment, the multi-channel alkali hydrogen production system further includes two purity detection devices. One of the purity detection devices is configured to detect a purity detection value of a gas output channel of the hydrogen-alkali treatment unit, and the other of the purity detection devices is configured to detect a purity detection value of a gas output channel of the oxygen-alkali treatment unit. The controller is further configured to calculate a current setting value of the electrolyzer according to the purity detection values detected by the two purity detection devices.

In an embodiment, in a case that the alkali liquor circulation volume reference value is less than a preset threshold, and only one controllable channel of the hydrogen-alkali channel and only one controllable channel of the oxygen-alkali channel operate in the adjustable output state, the controller controls output volumes of the two controllable channels operating in the adjustable output state according to the purity detection values detected by the two purity detection devices.

In an embodiment, the multi-channel alkali hydrogen production system further includes a temperature regulation system. The temperature regulation system includes: an alkali liquor temperature measurement device, at least two controllable channels, and at least one temperature regulation device. The at least two controllable channels are configured to transmit alkali liquor and arranged between the alkali liquor circulating pump and a liquid outlet confluence of the hydrogen-alkali treatment unit and the oxygen-alkali treatment unit. The at least one temperature regulation device is arranged outside at least one of the controllable channels of the temperature regulation system. The controller is further configured to adjust the temperature regulation device and an operation state of the controllable channel corresponding to the temperature regulation device according to a temperature detection value of circulating alkali liquor detected by the alkali liquor temperature measurement device, to adjust temperature of the circulating alkali liquor.

In an embodiment, the temperature regulation device includes an alkali liquor cooler and/or an alkali liquor heater.

In an embodiment, the controller, for adjusting the temperature regulation device and the operation state of the controllable channel corresponding to the temperature regulation device according to the temperature detection value of circulating alkali liquor to adjust the temperature of the circulating alkali liquor, is configured to: control, in a case that the temperature detection value exceeds an upper limit of a preset temperature range, the alkali liquor cooler and the controllable channel corresponding to the alkali liquor cooler to operate, to reduce the temperature of the circulating alkali liquor; control, in a case that the temperature detection value is within the preset temperature range, the controllable channel not provided with the alkali liquor heater and the alkali liquor cooler to operate, to maintain the temperature of the circulating alkali liquor; and control, in a case that the temperature detection value is lower than a lower limit of the preset temperature range, the alkali liquor heater and the controllable channel corresponding to the alkali liquor heater to operate, to raise the temperature of the circulating alkali liquor.

In an embodiment, the alkali liquor temperature measurement device comprises at least three temperature detection devices, wherein the temperature detection devices are respectively arranged between the oxygen-alkali channel and the oxygen-alkali treatment unit, between the hydrogen-alkali channel and the hydrogen-alkali treatment unit, and between the alkali liquor flowmeter and the alkali liquor circulating pump.

In an embodiment, each of the controllable channels includes a channel and a switch arranged on the channel. The switch is a regulating valve or an on-off valve.

In an embodiment, switches on at least one of the at least one controllable channel connected in parallel with the alkali liquor circulating pump, at least one of the controllable channels of the gas output channel of the hydrogen-alkali treatment unit, at least one of the controllable channels of the gas output channel of the oxygen-alkali treatment unit, at least one of the controllable channels of the hydrogen-alkali channel, and at least one of the controllable channels of the oxygen-alkali channel are regulating valves.

In an embodiment, a diameter of the channel provided with the regulating valve is smaller than a diameter of the channel provided with the on-off valve.

In an embodiment, the alkali liquor circulating pump is a shielded pump.

It can be seen from the above technical solutions that a multi-channel alkali hydrogen production system is provided according to the present disclosure. A hydrogen-alkali treatment unit receives hydrogen and alkali liquor outputted from a negative electrode of an electrolyzer through a hydrogen-alkali channel. An oxygen-alkali treatment unit receives oxygen and alkali liquor outputted from a positive electrode of the electrolyzer through an oxygen-alkali channel. Liquid outlets of the two treatment units output the circulating alkali liquor to an alkali liquor circulating pump and at least one controllable channel in parallel with the alkali liquor circulating pump, and then the circulating alkali liquor returns to the negative electrode of the electrolyzer. A controller controls an hydrogen production amount according to a detected current of the electrolyzer, and calculates an alkali liquor circulation volume reference value according to the hydrogen production amount, and according to the alkali liquor circulation volume reference value, adjusts an alkali liquor circulation volume of the multi-channel alkali hydrogen production system and changes gas purity of the multi-channel alkali hydrogen production system by controlling operation states of controllable channels on two ends of the alkaline liquor circulating pump. In this way, the problems that the purity of the produced hydrogen is low and the production of hydrogen is stopped when the electrolyzer is powered by a renewable energy system and the renewable energy system operates in a trough are solved, so that the electrolyzer always operates at a full load and is not limited to operate at a load within a specific range. Therefore, the present disclosure is applicable to both the hydrogen production system powered by the non-renewable energy system and the hydrogen production system powered by the renewable energy system.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing the embodiments of the present disclosure, and those skilled in the art may obtain other drawings according to the provided drawings without any creative effort.

DETAILED DESCRIPTION OF EMBODIMENTS

In order to make the objective, the technical solutions and advantages of the embodiments of the present disclosure clear, the technical solutions of the embodiments of the present disclosure are described clearly and completely below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

In the present disclosure, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising one . . . " does not exclude the case that other similar elements may exist in the process, method, article or device.

A multi-channel alkali hydrogen production system is provided according to the embodiments of the present disclosure, to solve the problems in the conventional technology that when the hydrogen production system powered by a renewable energy system operates at a low load below 20%, the purity of produced hydrogen is small, which cannot meet use requirements. In this case, the hydrogen must be vented. When the purity of the produced hydrogen is less than a low limit interlocking value, the hydrogen production system is interlocked and shut down, that is, hydrogen production is stopped. Therefore, the conventional technology cannot be applicable to the renewable energy system.

Figure 1:
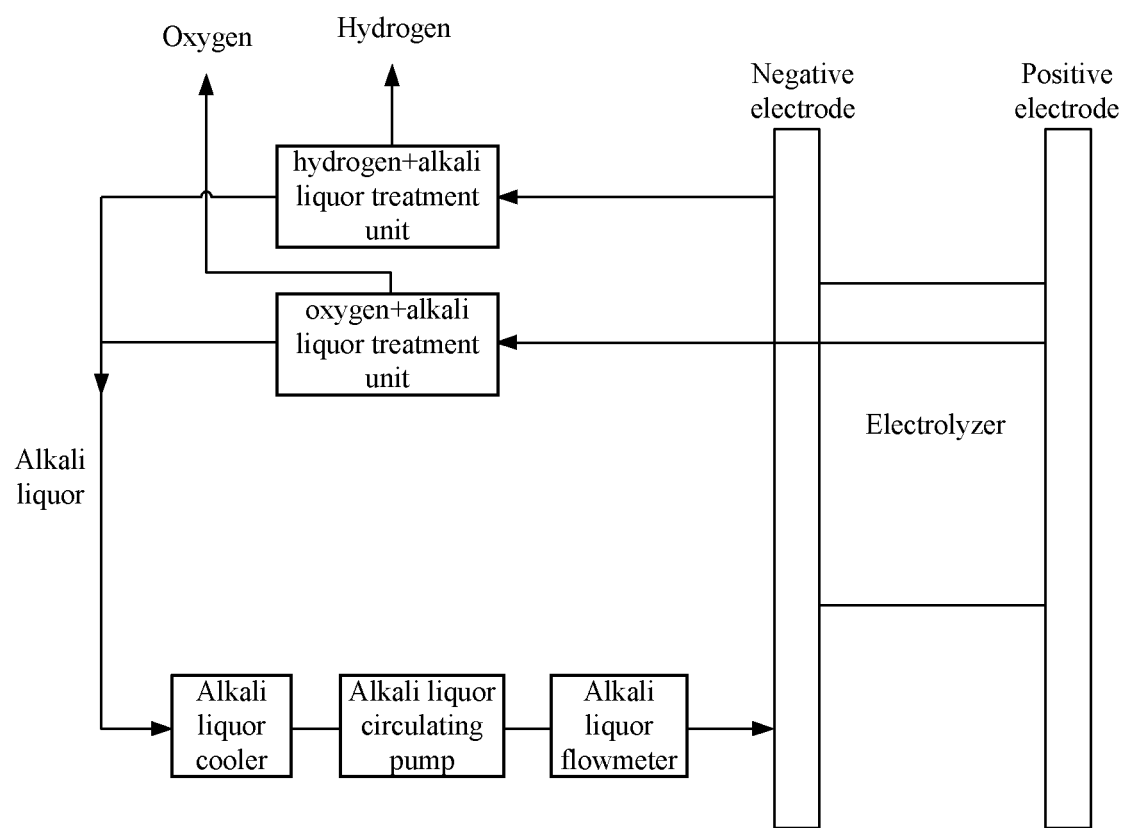
FIG. 1 is a schematic diagram of a water electrolytic hydrogen production system according to the conventional technology.
Figure 2:
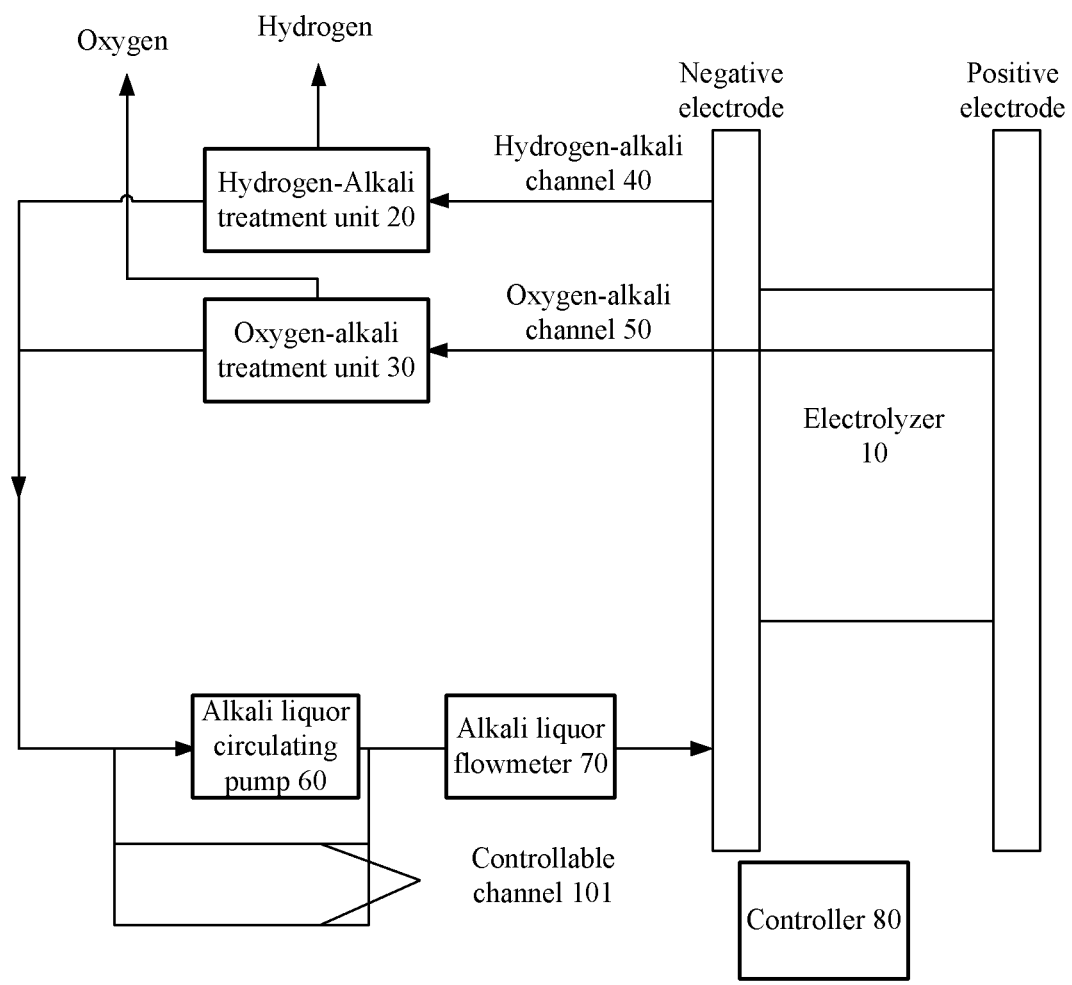
FIG. 2 is a schematic diagram of a multi-channel alkali hydrogen production system according to an embodiment of the present disclosure.

Referring to FIG. 2, the multi-channel alkali hydrogen production system includes an electrolyzer 10, a hydrogen-alkali channel 40, an oxygen-alkali channel 50, a hydrogen-alkali treatment unit 20, an oxygen-alkali treatment unit 30, an alkali liquor circulating pump 60, an alkali liquor flowmeter 70 and a controller 80.

An inlet of the hydrogen-alkali treatment unit 20 is connected to a hydrogen-alkali outlet on a negative electrode of the electrolyzer 10 via the hydrogen-alkali channel 40. An inlet of the oxygen-alkali treatment unit 30 is connected to an oxygen-alkali outlet on a positive electrode of the electrolyzer 10 via the oxygen-alkali channel 50. A liquid outlet of the hydrogen-alkali treatment unit 20 and a liquid outlet of the oxygen-alkali treatment unit 30 are connected to an inlet of the alkali liquor circulating pump 60. Specifically, the hydrogen-alkali outlet on the negative electrode of the electrolyzer 10 outputs hydrogen and alkali liquor to the inlet of the hydrogen-alkali treatment unit 20, and the oxygen-alkali outlet on the positive electrode outputs oxygen and alkali liquor to the inlet of the oxygen-alkali treatment unit 30. After treatment, the two treatment units output gas and alkali, that is, the oxygen-alkali treatment unit 30 outputs oxygen through a gas outlet of the oxygen-alkali treatment unit 30, and the hydrogen-alkali treatment unit 20 outputs hydrogen through a gas outlet of the hydrogen-alkali treatment unit 20. The liquid outlets of the two treatment units output alkali liquor to the inlet of the alkali liquor circulating pump 60.

Figure 3:
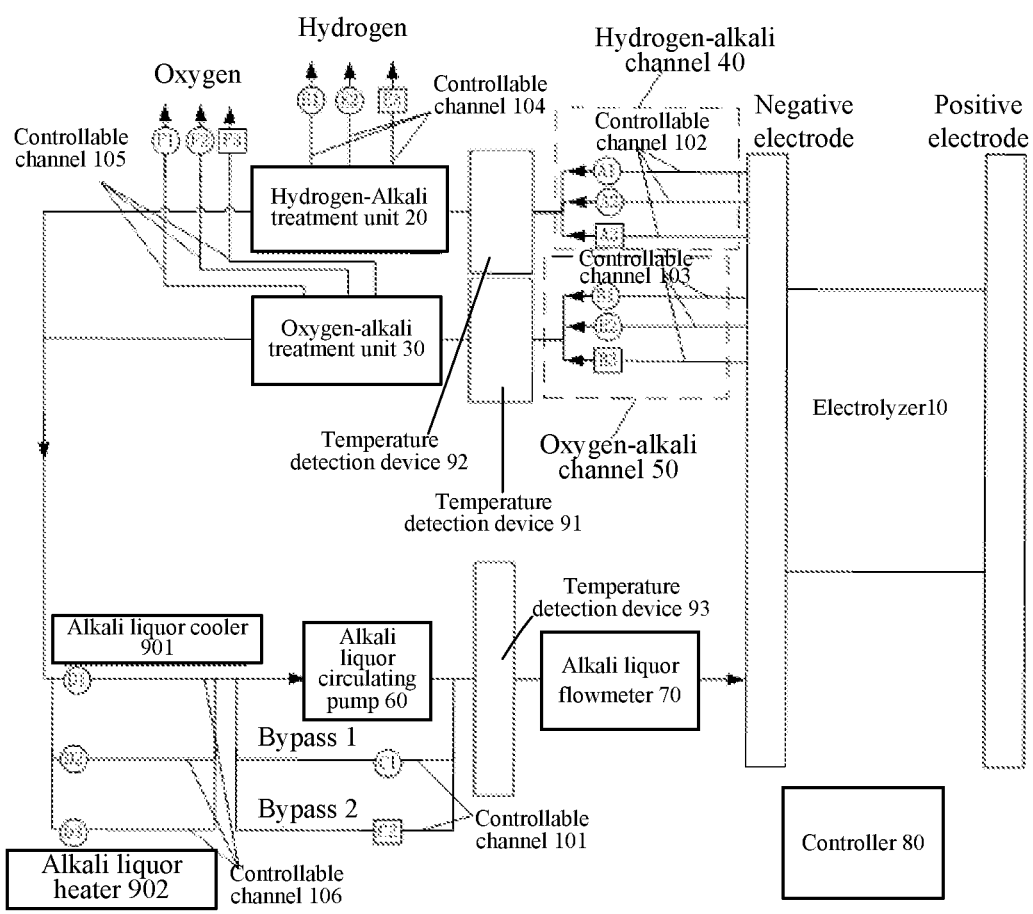
FIG. 3 is a schematic diagram of a multi-channel alkali hydrogen production system according to another embodiment of the present disclosure.

An outlet of the alkali liquor circulating pump 60 is connected to an alkali liquor inlet on the negative electrode of the electrolyzer 10 via the alkali liquor flowmeter 70. In addition, at least one controllable channels 101 (FIG. 2 shows two controllable channels 101 as an example) are arranged in parallel between the inlet and the outlet of the alkali liquor circulating pump 60. The controllable channels 101 include channels for transmitting alkali liquor (bypass 1 and bypass 2 as shown in FIG. 3) and switches (C1 and C2 as shown in FIG. 3) arranged on the channels. The switch is a regulating valve or an on-off valve. Switches on all of the controllable channels 101 connected in parallel with the alkali liquor circulating pump 60 are all regulating valves or all on-off valves. Alternatively, some of the switches are regulating valves and the others are on-off valves. As shown in FIG. 3, the switch C1 is an on-off valve and the switch C2 is a regulating valve.

It should be noted that due to a large span of the alkali liquor circulation volume, a frequency conversion regulating pump is difficult to meet the requirements of flow regulation. Therefore, the alkali liquor circulating pump 60 is preferably a shielded pump. In addition, in order to ensure a service life of the alkali liquor circulating pump 60, the alkali liquor circulating pump 60 should not operate at variable power frequently and is required to operate at rated power. Stable operation of the alkali liquor circulating pump 60 is conducive to reducing a concentration difference of the alkali liquor in the electrolyzer, which greatly reduces an electrochemical difference of the electrolyzer, so as to reduce a voltage of a small chamber of the electrolyzer 10, thereby facilitating hydrogen production of the electrolyzer 10.

The controller 80 is configured to control an hydrogen production amount according to a detected current of the electrolyzer 10, calculate an alkali liquor circulation volume reference value according to the hydrogen production amount, and according to the alkali liquor circulation volume reference value, adjust an alkali liquor circulation volume of the multi-channel alkali hydrogen production system and change gas purity of the multi-channel alkali hydrogen production system by controlling operation states of the controllable channels 101 connected in parallel with the alkali liquor circulating pump 60. The controller 80 may be a PLC (programmable logic controller), or other devices that are capable of performing the above steps, which is not repeated here.

It should be noted that the electrolyzer 10 includes an electrolyzer body, a positive electrode and a negative electrode. The electrolyzer 10 is an alkaline electrolyzer 10. The hydrogen production amount of the electrolyzer 10 is positively related to the current of the electrolyzer 10. A large current of the electrolyzer 10 results in a large hydrogen production amount of the electrolyzer 10. A small current of the electrolyzer 10 results in a small hydrogen production amount of the electrolyzer 10. Specifically, in a case that the electrolyzer 10 is powered by a renewable energy system such as a photovoltaic system or a wind energy system, input power of electrolyzer 10 is expressed as P=UI. A direct current voltage U is stable within a certain range, and a direct current I changes as the power of the renewable energy system changes. The controller 80 controls the hydrogen production amount by adjusting the direct current I. The oxygen production amount is fixedly equal to half of the hydrogen production amount. The calculation of the hydrogen production amount and the current may be with reference to the conventional technology and is not repeated here, which is within the protection scope of the present disclosure.

In addition, the alkali liquor circulation volume directly affects the purity of hydrogen/oxygen in the electrolyzer 10. The hydrogen production amount of the conventional hydrogen production system is basically unchanged, that is, the alkali liquor circulation volume remains within an appropriate range. For the hydrogen production system powered by a renewable energy system, the hydrogen production amount changes as electric energy supplying power changes, that is, the hydrogen production amount is always changing, and an alkali liquor circulation volume is required to match the hydrogen production amount, so as to cause the purity of the produced hydrogen of the electrolyzer 10 meet the requirements. Therefore, in the present disclosure, by controlling operation states of the controllable channels 101 connected in parallel with the alkali liquor circulating pump 60, the alkali liquor circulation volume of the multi-channel alkali hydrogen production system is adjusted and the gas purity of the multi-channel alkali hydrogen production system is changed, so that the present disclosure is applicable to the hydrogen production system powered by the renewable energy system.

Specifically, the operation state of the controllable channel 101 may include the following cases: a case in which the operation state includes a full load output state and a zero load output state, a case in which the operation state includes only an adjustable load output state, and a case in which the operation state includes the full load output state, the zero load output state, and the adjustable load output state. Specific states included in the operation state of the controllable channel 101 may be determined according to actual situations. Different operations states of the controllable channel 101 connected in parallel with the alkali circulating pump 60 respectively correspond to different alkali liquor circulation volume of the multi-channel alkali hydrogen production system. Taking a case in which one controllable channel 101 is connected in parallel with the alkali liquor circulating pump 60 and the operation state of the controllable channel 101 includes the above three states as an example, when the controllable channel 101 operates in the full load output state, the alkali liquor circulation volume of the multi-channel alkali hydrogen production system is the largest. When the controllable channel 101 operates in the adjustable output state, the alkali liquor circulation volume of the multi-channel alkali hydrogen production system may be changed, and the alkali liquor circulation volume in this case is less than that in the full load output state. When the controllable channel 101 operates in the zero output state, the alkali liquor circulation volume of the multi-channel alkali hydrogen production system is the smallest, that is, the alkali liquor circulation volume is zero.

If the multi-channel alkali hydrogen production system is powered by a renewable energy system, when the energy of the renewable energy system reaches a peak value, that is, when the current of the electrolyzer 10 reaches a peak value, the alkali liquor circulation volume is controlled to be large. When the energy of the renewable energy system reaches a trough value, that is, when the current of the electrolyzer 10 reaches a trough value, the alkali liquor circulation volume is controlled to be small. For example, a hydrogen production system of a plant sets that a hydrogen production amount of 500 $m^3/h$ corresponds to an alkali liquor circulation volume of 22 $m^3/h$, and a hydrogen production amount of 1 $m^3/h$ corresponds to an alkali liquor circulation volume of 0.4 $m^3/h$. If a hydrogen production amount obtained according to the current of the electrolyzer 10 is 500 $m^3/h$, the alkali liquor circulation volume is controlled to be 22 $m^3/h$. If a hydrogen production amount obtained according to the current of the electrolyzer 10 is 1 $m^3/h$, the alkali liquor circulation volume is controlled to be 0.4 $m^3/h$.

In practical application, a process of the controller 80 controlling the operation states of the controllable channels 101 connected in parallel with the alkali liquor circulating pump 60 according to the alkali liquor circulation volume reference value is as following. The controller 80 determines whether the alkali liquor circulation volume reference value is greater than a preset alkali liquor circulation volume. In a case that the alkali liquor circulation volume reference value is greater than the preset alkali liquor circulation volume, the controller controls all of the controllable channels 101 connected in parallel with the alkali liquor circulating pump 60 to operate in the full load output state, that is, the alkali liquor circulation volume is a maximum. In a case that the alkali liquor circulation volume reference value is less than or equal to the preset alkali liquor circulation volume, the controller 80 controls at least one of the controllable channels 101 connected in parallel with the alkali liquor circulating pump 60 to operate in the zero output state and/or the adjustable output state, that is, the alkali liquor circulation volume is less than the maximum. The preset alkali liquor circulation volume may be equal to the alkali liquor circulation volume when the electrolyzer 10 runs at a full load, or other values, such as an alkali liquor circulation volume when the electrolyzer 10 runs at 80% or 90% of the full load, which is not repeated here and all within the protection scope of the present disclosure.

In this embodiment, the controller 80 controls the hydrogen production amount according to the detected current of the electrolyzer 10, and calculates an alkali liquor circulation volume reference value according to the hydrogen production amount, and according to the alkali liquor circulation volume reference value, adjusts an alkali liquor circulation volume of the multi-channel alkali hydrogen production system and changes gas purity of the multi-channel alkali hydrogen production system by controlling the operation states of the controllable channels 101 on two ends of the alkaline liquor circulating pump 60. The problems that the purity of the produced hydrogen is low and the production of hydrogen is stopped when the electrolyzer 10 is powered by a renewable energy system and the renewable energy system operates in a trough are solved, so that the electrolyzer 10 always operates at a full load without being limited to operate at a load within a specific range. Therefore, the present disclosure is applicable to both the hydrogen production system powered by the non-renewable energy system and the hydrogen production system powered by the renewable energy system.

In an embodiment, as shown in FIG. 3, the hydrogen-alkali channel 40 and the oxygen-alkali channel 50 each is provided with at least two controllable channels (102 and 103 as shown in FIG. 3). Controllable channels 102 in the hydrogen-alkali channel 40 are used for transmitting hydrogen and alkali. Controllable channels 103 in the oxygen-alkali channel 50 are used for transmitting oxygen and alkali. That is, a flow of the hydrogen-alkali channel 40 and a flow of the oxygen-alkali channel 50 are controllable. In practical application, each of controllable channels (102 and 103 as shown in FIG. 3) in the hydrogen-alkali channel 40 and the oxygen-alkali channel 50 includes: a channel for transmitting alkali liquor and gas and a switch (A1, A2, A3, B1, B2 and B3 as shown in FIG. 3) arranged on the channel. The switch is a regulating valve or an on-off valve. Switches on all of the controllable channels 102 of the hydrogen-alkali channel 40 are all regulating valves or on-off valves. Alternatively, some of the switches are regulating valves and the others are on-off valves. As shown in FIG. 3, switches A1 and A2 are on-off valves and switch A3 is a regulating valve. A case of the switches on the controllable channels 103 of the oxygen-alkali channel 50 is similar to the case of the hydrogen-alkali channel described above, which is not repeated here.

It should be noted that by controlling the switches on the controllable channels 101 connected in parallel with the alkali liquor circulating pump 60, such as the switch C1 on the bypass 1 and the switch C2 on the bypass 2, the alkali liquor circulation volume can be controlled to a maximum extent. The on-off valves A1, A2, B1 and B2, and the regulating valves A3 and B3 can better control the alkali liquor circulation volume.

In practical application, in a case that the hydrogen-alkali channel 40 and the oxygen-alkali channel 50 each is provided with at least two controllable channels (102 and 103 as shown in FIG. 3), the controller 80 is further configured to control operation states of the controllable channels (102 and 103 as shown in FIG. 3) in the hydrogen-alkali channel 40 and the oxygen-alkali channel 50 according to the alkali liquor circulation volume reference value. In a case that the alkali liquor circulation volume reference value is large, the controllable channels (102 and 103 as shown in FIG. 3) in the hydrogen-alkali channel 40 and the oxygen-alkali channel 50 are controlled to operate in the full load output state. In a case that the alkali liquor circulation volume reference value is small, the controllable channels (102 and 103 as shown in FIG. 3) in the hydrogen-alkali channel 40 and the oxygen-alkali channel 50 are controlled not all to operate in the full load output state, so that the alkali liquor circulation volume can be adjusted to the alkali liquor circulation volume reference value.

A process of the controller 80 controlling the operation states of the controllable channels (102 and 103 as shown in FIG. 3) in the hydrogen-alkali channel 40 and the oxygen-alkali channel 50 according to the alkali liquor circulation volume reference value is as following. The controller 80 determines whether the alkali liquor circulation volume reference value is greater than a preset threshold. In a case that the alkali liquor circulation volume reference value is greater than the preset threshold, the controller 80 controls all controllable channels (102 and 103 as shown in FIG. 3) in the hydrogen-alkali channel 40 and the oxygen-alkali channel 50 to all operate in the full load output state. In a case that the alkali liquor circulation volume reference value is less than or equal to the preset threshold, the controller 80 controls at least one of the controllable channels 102 in the hydrogen-alkali channel 40 and at least one of the controllable channels 103 in the oxygen-alkali channel 50 to operate in the zero output state and/or the adjustable output state. The preset threshold may be the same as or different from the above preset alkali liquor circulation volume, which is not limited here, determined according to actual situations, and is within the protection scope of the present disclosure. In a case that the preset threshold is different from the above preset alkali liquor circulation volume, a value of the preset threshold is not limited here. The value may be determined according to actual situations and within the protection scope of the present disclosure.

In practical application, each of the gas output channel of the hydrogen-alkali treatment unit 20 and the gas output channel of the oxygen-alkali treatment unit 30 includes at least two controllable channels (104 and 105 as shown in FIG. 3). Controllable channels 104 in the gas output channel of the hydrogen-alkali treatment unit 20 are used for transmitting hydrogen. Controllable channels 105 in the gas output channel of the oxygen-alkali treatment unit 30 are used for transmitting oxygen. That is, a flow of the gas output channel of the hydrogen-alkali treatment unit 20 and a flow of the gas output channel of the oxygen-alkali treatment unit 30 are controllable. In practical application, each of the controllable channels (104 and 105 as shown in FIG. 3) in the two gas output channels includes: a channel for transmitting gas and a switch (E1, E2, E3, F1, F2 and F3 as shown in FIG. 3) arranged on the channel. The switch is a regulating valve or an on-off valve. Switches on all of the controllable channels 104 in the gas output channel of the hydrogen-alkali treatment unit 20 are all regulating valves or on-off valves. Alternatively, some of the switches are regulating valves and the others are on-off valves. As shown in FIG. 3, switches E1 and E2 are on-off valves and switch F3 is a regulating valve. A case of switches on the controllable channels 105 in the gas output channel of the oxygen-alkali treatment unit 30 is similar to the case of the hydrogen-alkali channel described above, which is not repeated here.

It should be noted that the on-off valves E1, E2, F1 and F2 cooperate with the regulating valves E3 and F3. When the electrolyzer 10 operates at a full load, the switches E1, E2, F1, F2, E3 and F3 are all fully open. When the load of the electrolyzer 10 decreases to a certain value, one of the on-off valves E1 and E2 and one of the on-off valves F1 and F2 are closed. When the load of the electrolyzer 10 continues to decrease, a gas output volume is adjusted by regulating openings of the regulating valves E3 and F3. When the load of the electrolyzer 10 continues to decrease, the on-off valves E1, E2, F1 and F2 are all closed, and gas only flows in the regulating valves E3 and F3. Thus, the gas output volume is adjusted to be a small by regulating openings of the regulating valves E3 and F3. In addition, in a case of small gas production amount, a thick pipeline is not suitable. The thick pipeline will greatly reduce a flow rate of the gas, increase residence time of the gas in treatment units, and affect a gas separation effect. The decrease of gas production amount causes a gradual decrease of the pressure of the multi-channel alkali hydrogen production system. On the contrary, when the gas production amount increases, a flow area is required to be increased to avoid excessive pressure of the multi-channel alkali hydrogen production system. Therefore, the channel with the regulating valve may be thinner than the channel with the on-off valve, and thus in a case of small gas production amount, for example, in a case of small hydrogen production amount, the gas only passes through the thin channel, for example, the channel with the regulating valve, so as to reduce the residence time of the gas in processing units. In a case of large hydrogen production amount, the gas may pass through the thick channel, for example, the channel with the on-off valve, so as to avoid excessive pressure of the multi-channel alkali hydrogen production system.

The multi-channel alkali hydrogen production system further includes: two pressure transmitters (not shown in the Figures). One of the pressure transformers is arranged at the gas outlet of the hydrogen-alkali treatment unit 20 and is configured to detect a pressure detection value of the gas output channel of the hydrogen-alkali treatment unit 20. The other of the pressure transformers is arranged at the gas outlet of the hydrogen-alkali treatment unit 30 and is configured to detect a pressure detection value of the gas output channel of the oxygen-alkali treatment unit 30.

The controller 80 is further configured to control operation states of controllable channels (104 and 105 as shown in FIG. 3) in the two gas output channels according to the pressure detection values detected by the two pressure transmitters. In a case that the two pressure detection values are both large, the controller 80 controls the controllable channels (104 and 105 as shown in FIG. 3) for transmitting gas to operate in the full load output state, so as to output hydrogen and oxygen at a maximum flow rate. In a case that the two pressure detection values are both small, the controller 80 controls the controllable channels (104 and 105 as shown in FIG. 3) for transmitting gas not to all operate in the full load output state, so as to output the hydrogen and the oxygen not at the maximum flow rate, thereby adjusting gas pressure of the multi-channel alkali hydrogen production system.

In practical application, the controller 80 controls the operation states of the controllable channels (104 and 105 as shown in FIG. 3) in the two gas output channels according to the pressure detection values detected by the two pressure transmitters as following. The controller 80 determines whether the two pressure detection values are both greater than a preset pressure value. In a case that the two pressure detection values are both greater than the preset pressure value, the controller 80 controls the controllable channels (104 and 105 as shown in FIG. 3) in the two gas output channels to operate in the full load output state. In a case that the two pressure detection values are both less than or equal to the preset pressure, the controller 80 controls at least one of the controllable channels 104 of the gas output channels of the hydrogen-alkali treatment unit 20 and at least one of the controllable channels 105 of the gas output channel of the oxygen-alkali treatment unit 30 to operate in the zero output state and/or the adjustable output state. The preset pressure may be a gas pressure when the electrolyzer 10 operates at a full load and the controllable channels (104 and 105 as shown in FIG. 3) of the two gas output channels all operate in the full load output state. Apparently, the preset pressure may be other values, such as a gas pressure when the electrolyzer 10 runs at 80% or 90% of the full load, which may be determined according to actual conditions and all within the protection scope of the present disclosure.

In practical application, the multi-channel alkali hydrogen production system further includes: two purity detection devices (not shown in the Figures). One of the purity detection devices is arranged at the gas outlet of the hydrogen-alkali treatment unit 20 and is configured to detect a purity detection value of the gas output channel of the hydrogen-alkali treatment unit 20, that is, hydrogen purity. The purity detection device may be a hydrogen purity instrument. The other of the purity detection devices is arranged at the gas outlet of the hydrogen-alkali treatment unit 30 and is configured to detect a purity detection value of the gas output channel of the oxygen-alkali treatment unit 30, that is, oxygen purity. The purity detection device may be an oxygen purity instrument.

On a premise of ensuring hydrogen purity, the controller 80 is further configured to calculate a current setting value of the electrolyzer 10 according to the purity detection values detected by the two purity detection devices and adjust the alkali liquor circulation volume to ensure qualification of the gas purity.

It should be noted that in a case that the alkali liquor circulation volume reference value is less than the preset threshold, and only one controllable channel of the hydrogen-alkali channel 40 and only one controllable channel of the oxygen-alkali channel 50 (a channel among 104 provided with the regulating valve E3 and a channel among 105 provided with the regulating valve F3 as shown in FIG. 3) operate in the adjustable output state, the controller 80 controls output volumes of the two controllable channels (the channel provided with the regulating valve E3 and the channel provided with the regulating valve F3) operating in the adjustable output state according to the purity detection values detected by the two purity detection devices.

Specifically, taking FIG. 3 as an example, the on-off valves A1, A2, B1 and B2 cooperate with the regulating valves A3 and B3 to control a mixing amount of gas and liquid. For example, in a case that a hydrogen production amount is 500 m³/h and an alkali liquor circulation volume is 22 m³/h, switches A1, A2, B1, B2, A3 and B3 are all open. When the hydrogen production amount decreases, the on-off valves A1, A2, B1 and B2 cooperate with the regulating valves A3 and B3, for example, the on-off valves A1 and B1 are closed, to obtain an ideal mixing amount. When the flow rate decreases to 1 m³/h, the on-off valves A1, A2, B1 and B2 are all closed, the opening of the regulating valve A3 is fine regulated according to the hydrogen purity, the opening of the regulating valve B3 is fine regulated according to the oxygen purity, and the alkali liquor circulation volume is adjusted to 0.4 m³/h.

In practical application, the multi-channel alkali hydrogen production system further includes a temperature regulation system. The temperature regulation system includes: an alkali liquor temperature measurement device, at least two controllable channels 106 and at least one temperature regulation device (an alkali liquor cooler 901 and an alkali liquor heater 902 as shown in FIG. 3).

The alkali liquor temperature measurement device includes at least three temperature detection devices (91, 92 and 93 as shown in FIG. 3). The temperature detection device 91 is arranged between the oxygen-alkali channel 50 and the oxygen-alkali treatment unit 30. The temperature detection device 92 is arranged between the hydrogen-alkali channel 40 and the hydrogen-alkali treatment unit 20. The temperature detection device 93 is arranged between the alkali liquor flowmeter 70 and the alkali liquor circulating pump 60.

The controllable channels 106 of the temperature regulation system are arranged between the alkali circulating pump 60 and a liquid outlet confluence of the hydrogen-alkali treatment unit 20 and the oxygen-alkali treatment unit 30 and are configured to transmit alkali liquor, that is, flow rates of alkali liquor in the controllable channels 106 of the temperature regulation system are controllable. In practical application, each of the controllable channels 106 of the temperature regulation system includes: a channel for transmitting alkali liquor and a switch arranged on the channel (D1, D3 and D3 as shown in FIG. 3). The switch is a regulating valve or an on-off valve. The switches on the controllable channels 106 of the temperature regulation system are preferably regulating valves. Apparently, the switches may also be on-off valves. Alternatively, some of the switches are regulating valves and the others are on-off valves.

The temperature regulation device is arranged outside at least one controllable channel 106 of the temperature regulation system. As shown in FIG. 3, the alkali liquor cooler 901 is arranged outside the controllable channel 106 including the switch D1. The alkali liquor heater 902 is arranged outside the controllable channel 106 including the switch D3. It should be noted that the at least one temperature regulation device may include only the alkali liquor cooler 901 or only the alkali liquor heater 902 (not shown in the Figures), or include the alkali liquor cooler 901 and the alkali liquor heater 902 (as shown in FIG. 3).

The controller 80 is further configured to adjust a temperature regulation device and an operation state of a controllable channel 106 corresponding to the temperature regulation device according to a temperature detection value of the circulating alkali liquor detected by the alkali liquor temperature measurement device, so as to adjust a temperature of the circulating alkali liquor.

Specifically, the controller 80 adjusts a temperature regulation device and an operation state of a controllable channel 106 corresponding to the temperature regulation device according to the temperature detection value of the circulating alkali liquor to adjust the temperature of the circulating alkali liquor as following. In a case that the temperature detection value exceeds a preset temperature range, the controller 80 controls the alkali liquor cooler 901 and the controllable channel 106 corresponding to the alkali liquor cooler 901 to operate, to reduce the temperature of the circulating alkali liquor. In a case that the temperature detection value is within the preset temperature range, the controller 80 controls the controllable channel 106 not provide with the alkali liquor heater 902 and the alkali liquor cooler 901 to operate, to maintain the temperature of the circulating alkali liquor. In a case that the temperature detection value is lower than the preset temperature range, the controller 80 controls the alkali liquor heater 902 and the controllable channel 106 corresponding to the alkali liquor heater 902 to operate, to raise the temperature of the circulating alkali liquor.

In detail, the large cubic electrolyzer 10 generates much heat during operation, and the temperature of the circulating alkali liquor may be reduced by using the waterway regulation system, that is, the alkali liquor cooler 901. For example, the switch D1 is opened to cause the circulating alkali liquor to pass through the channel provided with the alkali liquor cooler 901 outside. When the electrolyzer 10 generates little heat, for example, when the capacity of the renewable energy system decreases, the temperature of the electrolyzer 10 is maintained by maintaining the temperature of the circulating alkali liquor. For example, the switch D2 is opened to cause the circulating alkali liquor to pass through the channel not provided with the temperature regulation device. When the heat generated by the electrolyzer 10 continues to decrease and the temperature of the circulating alkali liquor cannot maintain the temperature of the electrolyzer 10, the switch D1 is closed and the switch D2 is opened to cause some alkali liquor to pass through the channel not provided with the temperature regulation device. When the load of the electrolyzer 10 decreases and the heat cannot maintain the temperature of the electrolyzer 10, the valve D3 is opened and the alkali liquor heater 902 is started to cause the temperature of the circulating alkali liquor to ensure the operating temperature of the electrolyzer 10. For example, when a hydrogen production amount of the hydrogen production system increases from 10 m³/h to 100 m³/h, the flow of alkali liquor suddenly increases and the temperature cannot meet the operation requirements. It is required to heat by the alkali liquor heater 902. When the temperature of the electrolyzer 10 meets the requirements, the alkali liquor heater 902 is closed. The function of the alkali liquor heater 902 and the alkali liquor cooler 901 is to maintain the operation of the electrolyzer 10 at a rated temperature.

It should be noted that the controller 80 is connected to corresponding devices in communication. In order to make the structural diagrams concise and clear, connecting lines for communication connections between the controller 80 and corresponding devices are not shown in the Figures. It is already described in the above embodiments the processes of the controller 80 for acquiring parameters or detection values of the corresponding devices, such as the current of the electrolyzer, the hydrogen purity, the hydrogen production amount, the hydrogen pressure, the oxygen purity, the oxygen production amount, oxygen pressure, the flow of alkali liquor and the temperature of alkali liquor, and the process of controlling the corresponding devices. That is, the communication connections may be with reference to the operation processes and principles of the controller 80 described above.

In the embodiments, each controllable channel (101, 102, 103, 104, 105 and 106 as shown in FIG. 3) includes a switch, so that the controller 80 controls opening and closing of the on-off valves and regulates openings of the regulating valves using an algorithm such as PID (Proportion-Integral-Derivative) algorithm according to feedback parameters such as the current of the electrolyzer 10, the gas pressure and the gas purity, so as to adjust the alkali liquor circulation amount according to energy change. The present disclosure is applicable to the hydrogen production system powered by a renewable energy system. In a case of low electric energy of the renewable energy system, qualified hydrogen can still be produced. Whether at a peak or a trough, the electrolyzer 10 can operate at a full load, which perfectly solves the problem of unqualified hydrogen when the electrolyzer 10 operates in trough and the problem that the electrolyzer 10 cannot operate in a case of too low electric energy. An energy utilization rate is close to 100%, which is very applicable to the hydrogen production system producing hydrogen using renewable energy.

Features recorded in various embodiments in this specification may be replaced or combined with each other. For the same or similar parts among the embodiments, one may refer to description of other embodiments. Since the device disclosed in the embodiments is basically similar to the method therein, the description thereof is relatively simple, and for relevant matters, one may refer to the description of the method embodiments. The system and embodiments of the system described in the above are merely illustrative. Units described as separate components may be or may not be physically separated. Components shown as units may be or may not be physical units, that is, may be located in one location or may be distributed in multiple network units. Parts or all of the modules may be selected based on actual conditions, to implement the technical solutions of the present disclosure. Those skilled in the art can understand and implement the present disclosure without any creative effort.

It should be appreciated by those skilled in the art that, the exemplary units and algorithm steps in the embodiments described herein can be implemented as electronic hardware, computer software, or a combination of computer software and the electronic hardware. In order to clearly illustrate the interchangeability of hardware and software, the composition and steps of each example have been described generally in terms of functions in the above description. Whether the functions being implemented in a hardware form or in a software form depends on a particular application of technical solutions and a design constraint. Skilled artisans may implement the described functions in varying ways for a particular application, but such implementation should not be interpreted as causing a departure from the scope of the present disclosure.

With the description of the embodiments disclosed above, those skilled in the art may implement or use the technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A multi-channel alkali hydrogen production system, comprising:
at least one controllable channel arranged in parallel between an inlet and an outlet of an alkali liquor circulating pump within the multi-channel alkali hydrogen production system, and
a controller within the multi-channel alkali hydrogen production system configured to control a hydrogen production amount according to a detected current of an electrolyzer, calculate an alkali liquor circulation volume reference value according to the hydrogen production amount, and according to the alkali liquor circulation volume reference value, adjust an alkali liquor circulation volume of the multi-channel alkali hydrogen production system and change gas purity of the multi-channel alkali hydrogen production system by controlling an operation state of the controllable channel connected in parallel with the alkali liquor circulating pump.

2. The multi-channel alkali hydrogen production system according to claim 1, further comprising: the electrolyzer, a hydrogen-alkali channel, an oxygen-alkali channel, a hydrogen-alkali treatment unit, an oxygen-alkali treatment unit, and an alkali liquor flowmeter, wherein:
an inlet of the hydrogen-alkali treatment unit is connected to a hydrogen-alkali outlet on a negative electrode of the electrolyzer via the hydrogen-alkali channel;
an inlet of the oxygen-alkali treatment unit is connected to an oxygen-alkali outlet on a positive electrode of the electrolyzer via the oxygen-alkali channel;
a liquid outlet of the hydrogen-alkali treatment unit and a liquid outlet of the oxygen-alkali treatment unit are connected to an inlet of the alkali liquor circulating pump and an inlet of the controllable channel connected in parallel with the alkali liquor circulating pump; and
an outlet of the alkali liquor circulating pump is connected to an alkali liquor inlet on the negative electrode of the electrolyzer via the alkali liquor flowmeter.

3. The multi-channel alkali hydrogen production system according to claim 1, wherein the controller, for controlling the hydrogen production amount according to the detected current of the electrolyzer, calculating the alkali liquor circulation volume reference value according to the hydrogen production amount, and according to the alkali liquor circulation volume reference value, adjusting the alkali liquor circulation volume of the multi-channel alkali hydrogen production system and changing gas purity of the multi-channel alkali hydrogen production system by controlling the operation state of the controllable channel connected in parallel with the alkali liquor circulating pump, is configured to:
control, in a case that the alkali liquor circulation volume reference value is greater than a preset alkali liquor circulation volume, all of the at least one controllable channel connected in parallel with the alkali liquor circulating pump to operate in a full load output state; and
control, in a case that the alkali liquor circulation volume reference value is less than or equal to the preset alkali liquor circulation volume, at least one of the at least one controllable channel connected in parallel with the alkali liquor circulating pump to operate in a zero output state and/or an adjustable output state.

4. The multi-channel alkali hydrogen production system according to claim 2, wherein the hydrogen-alkali channel and the oxygen-alkali channel each is provided with at least two controllable channels; and
the controller is further configured to control operation states of the controllable channels of the hydrogen-alkali channel and the oxygen-alkali channel according to the alkali liquor circulation volume reference value, to adjust the alkali liquor circulation amount to the alkali liquor circulation volume reference value.

5. The multi-channel alkali hydrogen production system according to claim 4, wherein the controller, for controlling operation states of controllable channels of the hydrogen-alkali channel and the oxygen-alkali channel according to the alkali liquor circulation volume reference value, is configured to:
control, in a case that the alkali liquor circulation volume reference value is greater than a preset threshold, all of the controllable channels of the hydrogen-alkali channel and the oxygen-alkali channel to operate in a full load output state; and
control, in a case that the alkali liquor circulation volume reference value is less than or equal to the preset threshold, at least one of the controllable channels of the hydrogen-alkali channel and at least one of the controllable channels of the oxygen-alkali channel to operate in a zero output state and/or an adjustable output state.

6. The multi-channel alkali hydrogen production system according to claim 2, wherein:
a gas output channel of the hydrogen-alkali treatment unit and a gas output channel of the oxygen-alkali treatment unit each comprises at least two controllable channels; and
the multi-channel alkali hydrogen production system further comprises two pressure transmitters, one of the pressure transmitters is configured to detect a pressure detection value of the gas output channel of the hydrogen-alkali treatment unit and the other of the pressure transmitters is configured to detect a pressure detection value of the gas output channel of the oxygen-alkali treatment unit; and
the controller is further configured to control operation states of the controllable channels of the two gas output channels according to the pressure detection values detected by the two pressure transmitters, to adjust a gas pressure of the multi-channel alkali hydrogen production system.

7. The multi-channel alkali hydrogen production system according to claim 6, wherein the controller, for controlling operation states of the controllable channels of the two gas output channels according to the pressure detection values detected by the two pressure transmitters, is configured to:
control, in a case that the two pressure detection values are both greater than a preset pressure value, the controllable channels of the two gas output channels to operate in a full load output state; and
control, in a case that the two pressure detection values are both less than or equal to the preset pressure value, at least one of the controllable channels of the gas output channel of the hydrogen-alkali treatment unit and at least one of the controllable channels of the gas output channel of the oxygen-alkali treatment unit to operate in a zero output state and/or an adjustable output state.

8. The multi-channel alkali hydrogen production system according to claim 2, further comprising two purity detection devices, wherein:
one of the purity detection devices is configured to detect a purity detection value of a gas output channel of the hydrogen-alkali treatment unit, and the other of the purity detection devices is configured to detect a purity detection value of a gas output channel of the oxygen-alkali treatment unit; and
the controller is further configured to calculate a current setting value of the electrolyzer according to the purity detection values detected by the two purity detection devices.

9. The multi-channel alkali hydrogen production system according to claim 8, wherein in a case that the alkali liquor circulation volume reference value is less than a preset threshold, and only one controllable channel of the hydrogen-alkali channel and only one controllable channel of the oxygen-alkali channel operate in the adjustable output state, the controller controls output volumes of the two controllable channels operating in the adjustable output state according to the purity detection values detected by the two purity detection devices.

10. The multi-channel alkali hydrogen production system according to claim 2, further comprising a temperature regulation system, wherein:
the temperature regulation system comprises:
an alkali liquor temperature measurement device;
at least two controllable channels configured to transmit alkali liquor and arranged between the alkali liquor circulating pump and a liquid outlet confluence of the hydrogen-alkali treatment unit and the oxygen-alkali treatment unit; and
a temperature regulation device arranged outside at least one of the controllable channels of the temperature regulation system;
the controller is further configured to adjust the temperature regulation device and an operation state of the controllable channel corresponding to the temperature regulation device according to a temperature detection value of circulating alkali liquor detected by the alkali liquor temperature measurement device, to adjust temperature of the circulating alkali liquor.

11. The multi-channel alkali hydrogen production system according to claim 10, wherein the temperature regulation device comprises an alkali liquor cooler and/or an alkali liquor heater.

12. The multi-channel alkali hydrogen production system according to claim 11, wherein the controller, for adjusting the temperature regulation device and the operation state of the controllable channel corresponding to the temperature regulation device according to the temperature detection value of circulating alkali liquor to adjust the temperature of the circulating alkali liquor, is configured to:
control, in a case that the temperature detection value exceeds an upper limit of a preset temperature range, the alkali liquor cooler and the controllable channel corresponding to the alkali liquor cooler to operate, to reduce the temperature of the circulating alkali liquor;
control, in a case that the temperature detection value is within the preset temperature range, the controllable channel not provided with the alkali liquor heater and the alkali liquor cooler to operate, to maintain the temperature of the circulating alkali liquor; and
control, in a case that the temperature detection value is lower than a lower limit of the preset temperature range, the alkali liquor heater and the controllable channel corresponding to the alkali liquor heater to operate, to raise the temperature of the circulating alkali liquor.

13. The multi-channel alkali hydrogen production system according to claim 10, wherein the alkali liquor temperature measurement device comprises at least three temperature detection devices, wherein the temperature detection devices are respectively arranged between the oxygen-alkali channel and the oxygen-alkali treatment unit, between the hydrogen-alkali channel and the hydrogen-alkali treatment unit, and between the alkali liquor flowmeter and the alkali liquor circulating pump.

14. The multi-channel alkali hydrogen production system according to claim 4, wherein:
   each of the controllable channels comprises a channel and a switch arranged on the channel; and
   the switch is a regulating valve or an on-off valve.

15. The multi-channel alkali hydrogen production system according to claim 14, wherein switches on at least one of the at least one controllable channel connected in parallel with the alkali liquor circulating pump, at least one of the controllable channels of the hydrogen-alkali channel, and at least one of the controllable channels of the oxygen-alkali channel are regulating valves.

16. The multi-channel alkali hydrogen production system according to claim 15, wherein a diameter of the channel provided with the regulating valve is smaller than a diameter of the channel provided with the on-off valve.

17. The multi-channel alkali hydrogen production system according to claim 1, wherein the alkali liquor circulating pump is a shielded pump.

18. The multi-channel alkali hydrogen production system according to claim 6, wherein:
   each of the controllable channels comprises a channel and a switch arranged on the channel; and
   the switch is a regulating valve or an on-off valve.

19. The multi-channel alkali hydrogen production system according to claim 18, wherein switches on at least one of the at least one controllable channel connected in parallel with the alkali liquor circulating pump, at least one of the controllable channels of the gas output channel of the hydrogen-alkali treatment unit, and at least one of the controllable channels of the gas output channel of the oxygen-alkali treatment unit are regulating valves.

* * * * *